United States Patent [19]

Silken

[11] Patent Number: 4,553,462

[45] Date of Patent: Nov. 19, 1985

[54] RADIAL ARM SAW

[76] Inventor: Howard Silken, 8676 Bridle Path Course, Davie, Fla. 33328

[21] Appl. No.: 545,617

[22] Filed: Oct. 26, 1983

[51] Int. Cl.$^4$ .............................................. B27B 5/20
[52] U.S. Cl. .................................... 83/471.3; 83/473; 83/486.1; 83/527; 83/574
[58] Field of Search .................... 83/471.2, 471.3, 473, 83/477.1, 485, 486, 486.1, 487, 488, 581, 527, 574

[56] References Cited

U.S. PATENT DOCUMENTS

| | | | |
|---|---|---|---|
| 2,506,076 | 5/1950 | Garrison | 83/485 |
| 2,696,851 | 12/1954 | Davis | 83/477.1 |
| 2,959,200 | 11/1960 | Cassey | 83/477.1 |
| 3,090,269 | 5/1963 | Porter | 83/473 |
| 3,534,646 | 10/1970 | Tyer, Jr. | 83/581 |
| 3,923,086 | 12/1975 | Spohn, Jr. | 83/471.3 |
| 4,184,395 | 1/1980 | Blachly et al. | 83/471.3 |

FOREIGN PATENT DOCUMENTS 55-5225  1/1980  Japan ................... 83/477.1

Primary Examiner—Frank T. Yost
Assistant Examiner—Hien H. Phan
Attorney, Agent, or Firm—Steele, Gould & Fried

[57] ABSTRACT

A radial arm assembly for mounting a power saw, the assembly comprising: a horizontally disposed base frame; two vertically oriented mounting posts disposed at opposite sides of an edge of the base frame; a cross-bar horizontally mounted on the posts at opposite ends of the cross-bar; an arm for supporting the saw, the arm being attached to the cross-bar substantially centered between the ends, the arm adapted to rotate over the base frame about a vertical axis, the arm comprising a guideway along substantially all of the arm; and, the saw being mounted on the arm and adapted to translate along the guideway, a blade of the saw being moveable with the saw along said guideway, unobstructed by either of the posts, and to and from a position substantially beneath the vertical axis, whereby cuts substantially corresponding to the full length of the arm may be effected.

16 Claims, 7 Drawing Figures

RADIAL ARM SAW

BACKGROUND OF THE INVENTION

This invention seeks to improve on the current radial arm saws now on the market. The standard radial arm saw has a cross cut capacity that is limited by the length of the arm. In order to cross cut 24" (½ the width of a 4'×8' panel) the arm has to be quite a bit longer than the 24" travel of the roller head in the arm track. The roller head cannot be retracted the full length of the arm. About 6" to 8" of the arm is used to support itself on the top of the post-base structure at the rear of the arm. The roller head strikes the post preventing it from retracting to the entire length of the arm. On the current saws, in order to let the operator cut 24" in one pull, the length of the arm must be increased by 6" to 8". With this extra length arm the rest of the saw must also be increased in size and weight. Because the arm must be longer, it too must be of heavier construction. To support this heavier arm the post and base structure must be increased in size and weight. Because the arm is longer and heavier, the width of the table and frame must be wider. For this reason current radial arm saws that will cut 24" in one pull are very large and heavy. They are made for heavy duty industrial use only. Smaller saws, having 10" to 12" blades, used by small shops and homecraftsmen, do not have this capacity at the present time. There is a great need for a smaller medium duty radial arm saw that will cut 24" and not be large, heavy and expensive.

The present radial arm saws that use only one post and base have a disadvantage when the saw is mitered to cross cut an angle other than 90° to the fence. This is because the saw blade, in the retract position, is located to the left of the pivot of the arm. When mitering to the right (45°) the blade is so far to the right that even the original 90° cross cut must be located to the left of center on the work table. This puts the right hand 45° miter on the table but positions the left hand 45° miter off the table on the left side. When cutting a left hand 45° miter on the current saws, the operator must move the fence from its normal position usually at least one-third of the weight toward the front, to the extreme back position. On current radial arm saws, the saw blade strikes the fence when mitering 45° to the right. If the saw blade is engaged to the back boards, as it must be, the saw cannot be moved to the miter position unless the blade is raised first and then lowered once it is in the desired miter position. On standard radial arm saws, on the market today, the location of the 90° cross cut being off center causes problems when cutting long boards.

Standard radial arm saws that use only one post and base combination have a very serious problem with alignment. They must be constructed so that the post can go up and down in the base and, at the same time, not be able to rotate in it at will. Any rotation, even the slightest, will cause the arm to deviate from its locked located position on the post. This can cause inaccurate angle cuts as well as waste of material and frustration of the operator. The standard method of rotation prevention is the use of a key and key-way on the post - base combination. The base must also have some method to take up for any wear between the base and the post. A slight amount of play between the base and post can cause "end play" resulting in inaccurate cross cuts as well as misalignment of the blade to the fence when ripping (making cuts parallel to the fence). On present radial arm saws, the most difficult maintenance chore is constant adjustment to eliminate "end play."

SUMMARY OF THE INVENTION

Accordingly, it is an object of this invention to provide a radial arm saw that can cut up and behind the saw's mounting posts unobstructed by these posts.

It is a further object of the invention to provide a radial arm saw that maintains accuracy of alignment by minimizing wear between post and base, and the arm and the arm's supporting structure.

It is another object of the invention to provide a radial arm saw that can make left and right hand miter cuts substantially centered, left to right, on the table by pivoting the blade on its vertical centerline.

It is yet another object of the invention to substantially eliminate the necessity for the operator to repeatedly raise and lower the saw blade over the fence during miter cuts.

In accordance with these and other objects that shall become apparent hereinafter, there is provided a radial arm saw and support structure therefore that overcomes the deficiencies of the prior art and secures the objects of this invention by providing a support structure having a horizontally disposed base frame and a pair of posts vertically mounted on the frame. Between the posts is a horizontal cross-beam rigidly fixed at its extremities across the tops of the posts. Mounted centrally on the cross-beam is a combination support and bearing structure (which can be a simple cylinder) upon which is mounted on elongate offset arm that holds the saw. The arm is provided with a guideway along its length to guide the saw during cutting operations. The arm can rotate in a horizontal plane about the support and bearing structure so as to position the saw in any of a plurality of horizontal cutting directions. The posts are formed of telescoping members so as to enable one to raise or lower the height of the cross-beam (and hence the saw).

By centrally mounting the arm between two posts, neither post obstructs motion of the saw along the guideway, thus enabling the saw to move freely beyond the fence during cutting operations. Because the height adjustments and rotational arm adjustments are performed by distinct members, wear on each and consequent inaccuracy in alignment, is reduced.

As a further consequence of the scheme wherein there are no mounts posts which can obstruct movement of the saw along the arm, an operator can slide the saw all of the way to the back of the arm while making cuts, that is, to a position between the posts. It is therefore possible to make longer cuts. With this arrangement, miter cuts intersect one another at the same point along the guide fence, which is disposed at the rear edge of the base or table. This make it unnecessary to constantly re-align boards along the fence between such cuts.

The instant invention will be more fully understood from the following detailed description, it being understood, however, that the invention is capable of extended application, and is not confined to the precise disclosure. Changes and modifications may be made that do not affect the spirit of the invention, nor exceed the scope thereof, as expressed in the appended claims. Accordingly, the instant invention will now be described with particular reference to the accompanying drawings.

DETAILED DESCRIPTION OF THE PREFERRED EMBODIMENTS

Figure 1:
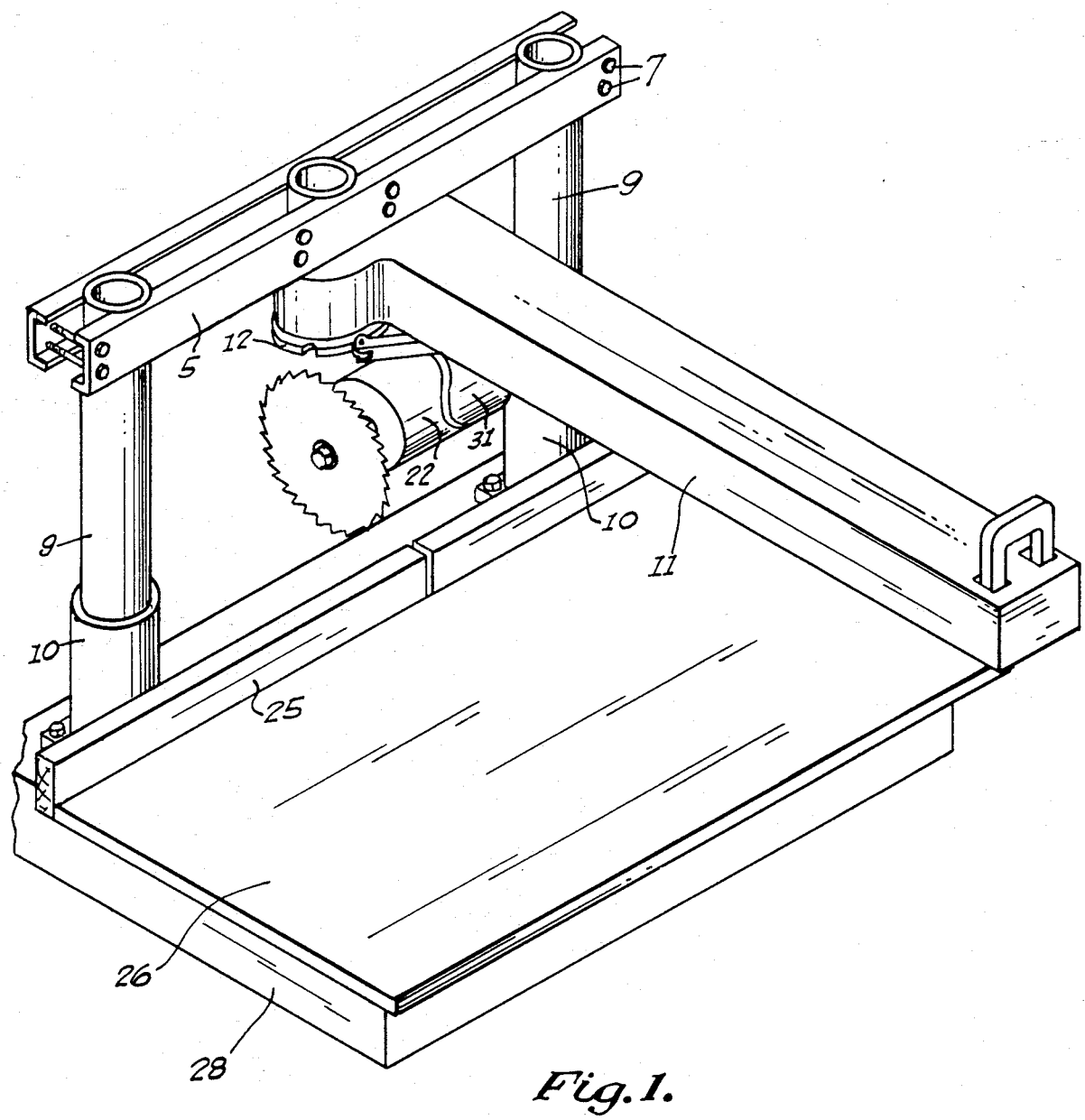
FIG. 1 is a perspective view of the invention mounted on a frame.

With particular reference to the drawings, the following parts of the invention are designated by reference numerals:

1 - Elevating Crank Handle: Can be mounted on right or left side. Also, can be located at table level. Any standard elevating method or location of same can be used. Crank handle is secured to tie rod #3 and supported by tie rod brackets 4.

2 - Worm and Gear: or the use of standard miter gears to cause elevating screw 29 to rotate when elevating crank handle 1 is turned.

3 - Tie Rod: assures that worm and gears 2 (or miter gears) will rotate at the same time and at the same speed. This action causes cross beam 5 to raise and/or lower and remain parallel to the frame 28 and table 26.

4 - Tie Rod Brackets: mounted on posts 9 (or cross beam 5) to assure the engagement of worm and gear 2 (or miter gears).

5 - Cross Beam: Supported on posts 9 and holding arm post 6.

6 - Arm Post: secured to cross beam 5 via any standard method with enough play in elongated mounting hole 12b so slight rotation can be achieved before locking it securely to cross beam 5 via wrap around bolts 5a.

7 - Cross Beam Secure Bolts: To lock cross beam 5 to posts 9. Any standard method of securing cross beam 5 to posts 9 can be used such as splitcasting on ends of cross beam 5 and wrap around bolts 5a.

8 - Safety Bolt: goes through casting of cross beam 5 and arm post 6. Safety bolt 8 goes through elongated hole 12b in arm post 6 enabling it to rotate a small amount in order to perform a rough alignment of arm 11 to fence 25.

9 - Post: Two are used and they are engaged to base(s) 10. Posts are the support system to suspend cross beam 5. When elevating screw 29 is rotated via linkage to elevating crank handle 1 the two posts 9 will raise and/or lower due to their engagement to elevating nut 30.

10 - Base: Two are used to hold posts 9. The two base(s) 10 are mounted and secured to frame 26 using any standard method. Elevating nut(s) 30 are secured to base 10 with any standard method.

11 - Arm: Cast iron or any other material used on standard radial arm saws. The arm 11 is mounted on the arm post 6 by split ring 11a and is supported by miter locator ring 12. This ring is secured to the bottom of the arm post 6 via any standard method such as pins, welding threads, etc. The arm 11 can swing to the right or left. Its limit is determined by the spread of the post(s) 9 and base(s) 10. To increase the amount of rotation of the radial arm (its extreme miter angle right and left), the distance can be increased by locating the post 9 and base 10 far enough apart so that the distance from the center of the cross beam 5 and the right and left post 9 - base 10 is longer than the arm 11. Naturally, the length of the cross beam 5 and table 26 - frame 28 would have to be increased accordingly. The arm 11 has two tracks as used in any standard radial arm saw arm. These tracks are engaged to standard roller head bearings mounted on any standard type roller head 15. The arm also holds a spring loaded pin that will locate into pre-cut (or cast) grooves on the miter locator ring 12. The arm is equipped with any standard method of securing the arm 11 to the arm post 6. Endcaps 18 are attached to the ends of the arm 11 via any standard method such as screws. This enables the operator to remove and replace the roller head 15 as well as the entire motor assembly 17, 20, 21, 22, 19, 23. When the angle of miter is selected and the arm 11 is located at the angle, the arm is equipped with standard locking methods to secure the arm 11 tight against (to) the arm post 6.

12 - Miter Locator Ring: is a pregrooved metal ring securely attached to the arm post 6. The grooves on the miter locator ring 12 receive miter locator pin 13 or any standard method of locating the miter angle of the arm 11.

13 - Miter Locator Pin: Or any standard method of radial arm saw miter location. This locator can be spring loaded and or a tapered lever type. Levers 33 and 33a which retract and engage the pin can be used to eliminate the need for the operator to reach back to the arm post 6.

14 - Yoke Locator Pin: enables the operator to convert the saw from cross cut to rip. This is the standard method of swinging the yoke assembly 17 in an out-rip or in-rip position. Yoke lock lever 16 is used to secure the yoke 17 securely to the roller head 15.

15 - Roller Head: Standard method of enabling the operator to pull the entire assembly back and forth on the arm 11.

16 - Yoke Lock Lever: standard method of locking yoke 17 to roller head 15.

17 - Yoke: standard method to hold motor 22 suspended above table 26.

18 - End Cap: attached to rear end of arm 11 to prevent roller head 15 from going off the track in arm 11.

19 - Guard: standard radial arm saw guard attached to motor 22 to cover saw blade 24.

20 - Bevel Lock Lever: standard method to lock motor 22 to yoke 17 in order to tilt the saw blade 24 to desired angle.

21 - Bevel Locator Pin: standard method to locate the tilt of the saw blade 24 at the popular important angles such as 90°, 45°, 30°, 0°.

22 - Motor: any standard radial arm saw motor can be used. The configuration of the arm 11 is so designed that saw blade 24 will be located down the center line of the arm post 6.

23 - Blade Washers: used to hold saw blade 24 will be located down the center line of the arm post 6.

24 - Saw Blade

25 - Fence: mounted on table 26 and back against base 10.

26 - Saw Table: mounted on frame 28 with table trunions 27.

27 - Table Trunions: used to hold table 26 to frame 28. Elongated holes on trunions 27 enable table 26 to be adjusted to make the table 26 parallel to the arm 11 to ensure equal depth of cut by saw blade 24. Or, any other standard method of table adjustment.

28 - Frame: used to hold table 28 and base(s) 10. Legs can be attached to underside of frame 28 to bring up table 26 to convenient working height.

29 - Elevating Screw

30 - Elevating Nut

In practice, the height of the saw is selected by cranking worm gears 2, and screw 29 and nut 30, thus lowering or raising cross beam 5. Tie rod 3 between worm gears 2 enables the saw's operator to raise both posts 9 in one operation, and ensures that each elevating screw 29 moves an identical amount, keeping level cross beam 5.

Figure 2:
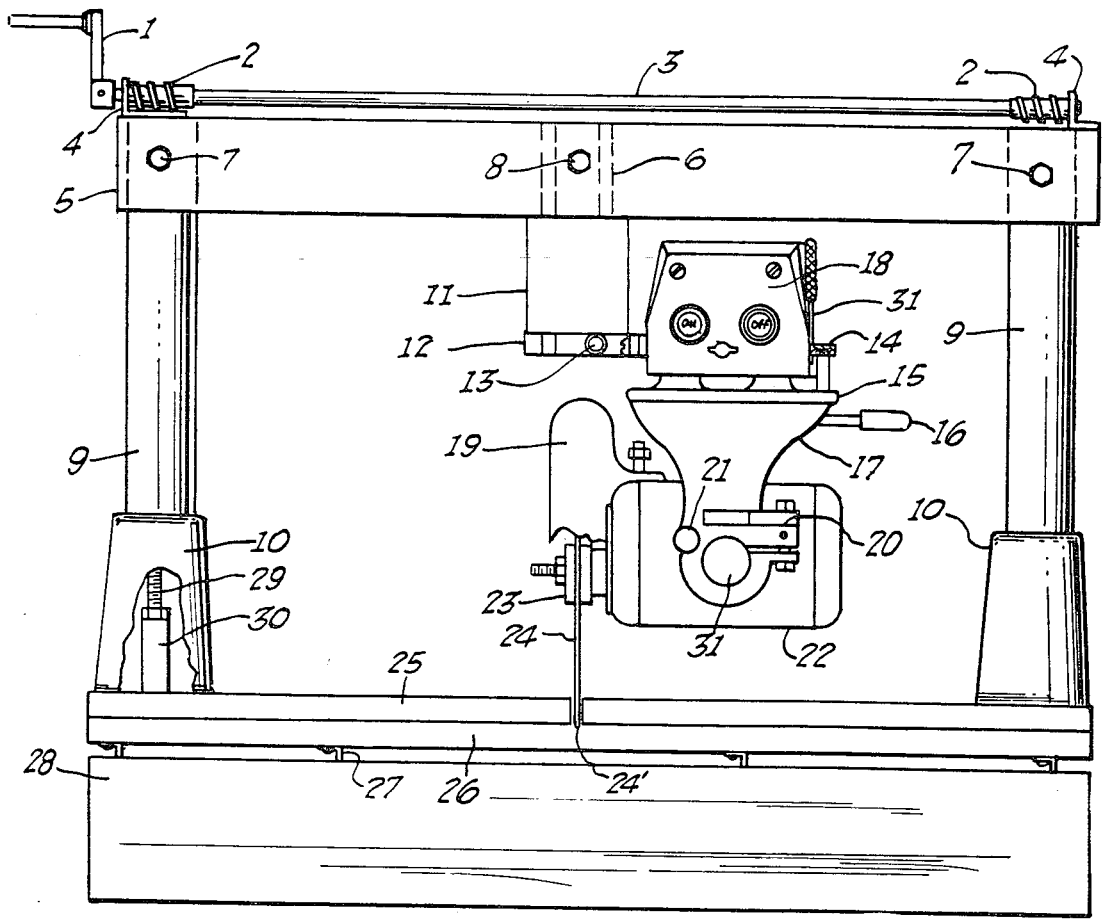
FIG. 2 is a front elevational view of the invention, mounted on a frame, partially broken away.

In contradistinction to the prior art, these posts must undergo only linear displacement, i.e. move up and down; the cross frame, not the posts, support the rotational motion of the arm. Because of this difference the instant invention is not subject to the sort of wear that is common in single post radial arm saws, which causes great difficulty in aligning such prior art saws for precise cuts. The saw assembly 17, 19, 22, 24 can be rotated about locator ring 12 to the correct horizontal (miter-cut, or cross-cut) position. As best seen in FIG. 2, if the saw assembly is drawn along arm 11 as far as possible towards posts 9, the assembly would locate between posts 9, and blade 24 would locate directly under ring 12. In the preferred embodiment, ring 12's axis of symmetry would pass through the arbor of motor 22, and would bisect blade 24. Because of this alignment, when the saw rotates about ring 12, the face of saw blade 24 rotates such that one point 24' on the blade's periphery always remains fixed with respect to the table. If one were to make several miter cuts, it is at point 24' that these cuts would intersect (unlike the prior art, in which there is no such point of intersection unless the operator were to move the wood along fence 25 a distance necessary to make these cuts intersect). The bottom portion of ring 12 is notched to enable one to rotate the saw assembly into any of several preselected miter positions. Pin 13 locks the saw assembly into the preselected position.

After selecting the desired miter position, the saw assembly can be moved along the length of arm 18 to make the desired cut.

Yoke 17 can rotate about a vertical axis, enabling one to make cuts parallel to fence 25. Yoke lever 16 is used to lock and unlock yoke 17 against such rotation.

Motor 22 depends from yoke 17 via fork bracket 31, within which motor 22 can pivot about a horizontal axis to allow for bevel cuts. Pin 21 locks and unlocks the motor from such pivoting.

Figure 7:
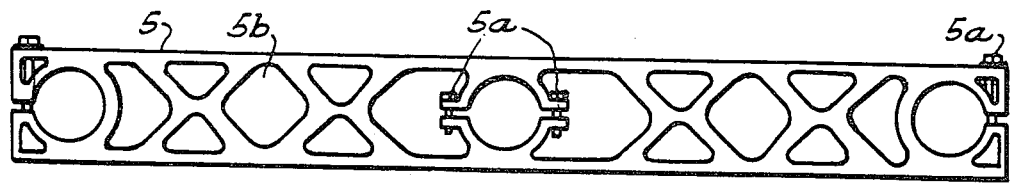
FIG. 7 is a top plan view of the cross-beam.
Figure 3:
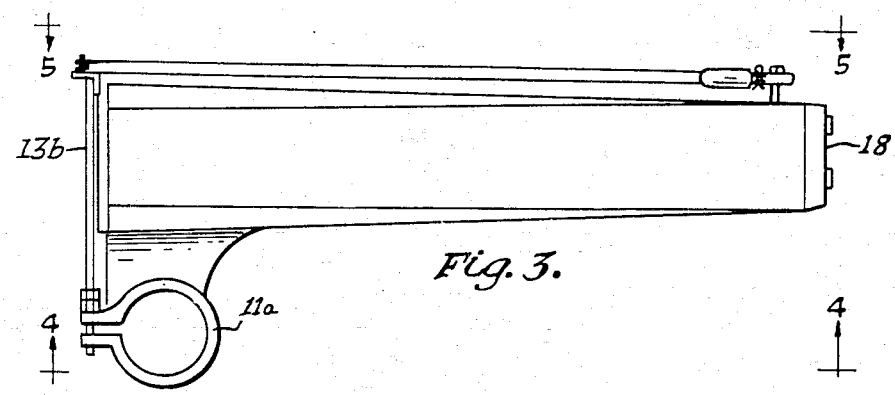
FIG. 3 is a top plan view of the radial saw's arm.
Figure 4:
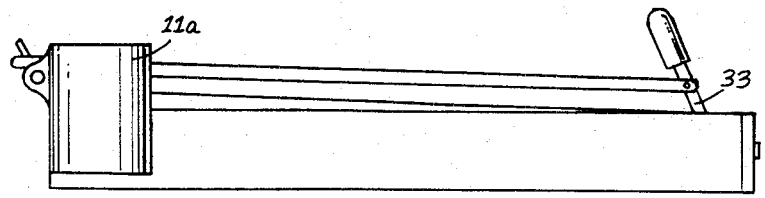
FIG. 4 is a side elevational view of the arm along lines 4—4 of FIG. 3.
Figure 5:
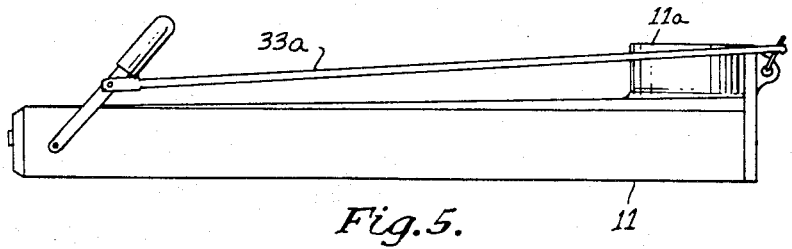
FIG. 5 is a side perspective view of the arm along lines 5—5 of FIG. 3.
Figure 6:
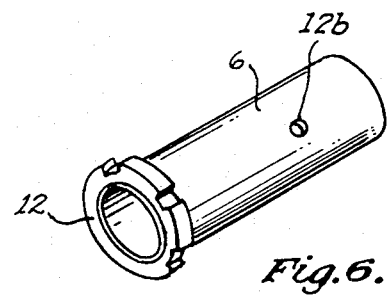
FIG. 6 is a perspective view of miter locking ring, about which the arm rotates.

The cross-beam of FIG. 7 is made from a single casting, and has apertures 5b therein selected to yield a lightweight, and structurally strong beam.

The instant invention has been shown and described herein in what is considered to be the most practical and preferred embodiment. It is recognized, however, that departures may be made therefrom within the scope of the invention, and that obvious modifications may occur to a person skilled in the art. Accordingly, the scope of the invention is defined by, and to be determined solely by reference to the appended claims.

What I claim is:

1. A radial arm assembly for mounting a power saw, said assembly comprising:

a horizontally disposed base frame;

two vertically adjustable mounting posts disposed at opposite sides of an edge of said base frame;

means for precisely coordinating adjustment of said vertical posts;

a cross-bar means horizontally mounted on said posts at opposite ends of said cross-bar means;

an arm means for supporting said saw, said arm means being rotatably attached to said cross-bar means about a vertical axis between said ends, said arm means being thereby adapted to rotate over said base frame about said vertical axis, said arm means comprising a guideway along substantially all of said arm; and, said saw being mountable on said arm means and adapted to translate along said guideway, a blade of said saw being moveable with said saw along said guideway, unobstructed by either of said posts, to and from a position substantially intersecting said vertical axis, whereby vertical and rotational adjustments of said saw are independent of one another and cuts substantially corresponding to the full length of said arm means may be effected.

2. The radial arm assembly of claim 1, further comprising means for mounting a circular power saw to said arm means, said circular power saw having a circular saw blade disposed for rotation in a vertical plane, about a horizontal axis, said plane passing through said vertical axis.

3. The radial arm assembly of claim 2, further comprising a fence for guiding and positioning work pieces, said fence being disposed at said edge of said base frame adjacent said mounting posts.

4. The radial arm assembly of claim 3, wherein each of said mounting posts comprises telescopic members operable in response to said coordinating adjustment means, for effecting said vertical adjustment.

5. The radial arm assembly of claim 4, further comprising means for precisely positioning said arm means at at plurality of rotational positions about said vertical axis, whereby a plurality of premeasured miter angles may be selected.

6. The radial arm assembly of claim 5, wherein said arm means is mounted to said cross-bar means at a point laterally offset from said arm means at one end of said arm means.

7. The radial arm assembly of claim 5, wherein said vertical axis is disposed substantially centered between said ends.

8. The radial arm assembly of claim 1, further comprising a fence for guiding and positioning work pieces, said fence being disposed at said edge of said base frame adjacent said mounting posts.

9. The radial arm assembly of claim 1, wherein each of said mounting posts comprises telescopic members operable in response to said coordinating adjustment means, for effecting said vertical adjustment.

10. The radial arm assembly of claim 1, further comprising means for precisely positioning said arm means at at plurality of rotational positions about said vertical axis, whereby a plurality of premeasured miter angles may be selected.

11. The radial arm assembly of claim 1, wherein said arm means is mounted to said cross-bar means as a point laterally offset from said arm means at one end of said arm means.

12. The radial arm assembly of claim 1, wherein said vertical axis is disposed substantially centered between said ends.

13. A radial arm saw, comprising:
a horizontally disposed base frame;
two vertically adjustable mounting posts disposed at opposite sides of an edge of said base frame;
means for precisely coordinating adjustment of said vertical posts;
a cross-bar horizontally mounted on said posts at opposite ends of said cross-bar;
a circular power saw;
a radial arm for supporting said saw, said arm being rotatably attached to said cross-bar about a vertical axis between said ends, said arm being thereby adapted to rotate over said base frame about said vertical axis, said arm comprising a guideway along substantially all of said arm, said saw being slidably mountable on said arm and adapted to translate along said guideway, unobstructed by either of said posts, to and from a position substantially intersecting said vertical axis, whereby vertical and rotational adjustments of said saw are independent of one another and cuts substantially corresponding to the full length of said arm means may be effected.

14. The radial arm saw of claim 13, wherein said saw has a circular saw blade disposed for rotation in a vertical plane, said plane passing through said vertical axis.

15. The radial arm assembly of claim 13, wherein said arm is mounted to said cross-bar at a point laterally offset from said arm at one end of said arm.

16. The radial arm assembly of claim 14, wherein said arm is mounted to said cross-bar at a point laterally offset from said arm at one end of said arm.

* * * * *